United States Patent

[15] 3,642,042

Davidson et al.

[45] Feb. 15, 1972

[54] METHOD OF FORMING WOOD

[72] Inventors: Robert W. Davidson, 134 Somerset Road, Syracuse, N.Y. 13224; Conrad Schuerch, 125 Concord Place, Syracuse, N.Y. 13310

[22] Filed: June 17, 1970

[21] Appl. No.: 46,843

[52] U.S. Cl. ............................................. 144/327, 34/13.4
[51] Int. Cl. ......................................... B27h 1/00
[58] Field of Search ................. 144/327, 254, 270, 271, 317, 144/322, 324; 34/9.5, 13.4, 16.5; 8/116.2

[56] References Cited

UNITED STATES PATENTS 3,282,313  11/1966  Schuerch ............................... 144/327
3,292,676  12/1966  VanHartesveldt et al. ......... 144/327 X Primary Examiner—Andrew R. Juhasz
Assistant Examiner—James F. Coan
Attorney—Stowell & Stowell

[57] ABSTRACT

Wood is treated with sulfur dioxide prior to impregnation of the wood with ammonia and forming the impregnated wood to a desired configuration to decrease the alteration of the color of the wood by the ammonia. Preferably air is removed from the wood by evacuation prior to the supplying of sulfur dioxide thereto and unreacted sulfur dioxide is removed from the wood by evacuation prior to the supplying of ammonia thereto.

2 Claims, 5 Drawing Figures

METHOD OF FORMING WOOD

U.S. Pat. No. 3,282,313 to Conrad Schuerch describes a method of forming wood by impregnating the wood with ammonia, forming the impregnated wood to a desired configuration and removing the ammonia from the formed wood. A disadvantage encountered in the use of this method is that the ammonia treatment brings about a color change in many woods which is frequently undesirable.

We have found that the color change of wood brought about by the treatment with ammonia may be eliminated or greatly decreased by subjecting the wood to the action of sulfur dioxide prior to the treatment with ammonia. It is out belief that the beneficial effect of the pretreatment of the wood with sulfur dioxide is due, at least in part, to the reaction of sulfur dioxide with carbonyl functions and with carbon-carbon unsaturated linkages in components of the wood substance whereby such components are stabilized against color change on treatment with ammonia.

For the greatest effectiveness of the sulfur dioxide treatment, it is desirable to evacuate air from the wood and to admit substantially saturated sulfur dioxide gas to the evacuated wood. When treating evacuated wood with saturated sulfur dioxide gas at normal ambient temperatures of the order of 25° C., a treating time of 10 minutes is sufficient for color control of ⅛-inch-thick material at a moisture content of 13 percent while 20 minutes is sufficient for material of 1-inch thickness. The use of less concentrated sulfur dioxide gas will retard the rate of reaction and necessitate longer periods of treatment.

Following the treatment with sulfur dioxide, the wood is again evacuated and treated with gaseous or liquid ammonia as described in the Schuerch patent. Following the ammonia treatment the wood is soft and flexible but has substantially the color of the original material. In this condition, the wood can be be formed into any desired configuration which will be retained after evaporation or can be readily defibered.

The method of the invention will be more fully described and the results obtained thereby set forth with reference to the accompanying drawings in which.

In tests of the method of the invention, ⅛inch by 1 inch by six inch specimens conditioned to approximately 13 percent moisture content where subjected to the action of ammonia as described in the Schuerch patent with and without a pretreatment of the evacuated specimens with saturated sulfur dioxide for 5 minutes at about 25° C. as described above.

Figure 1:
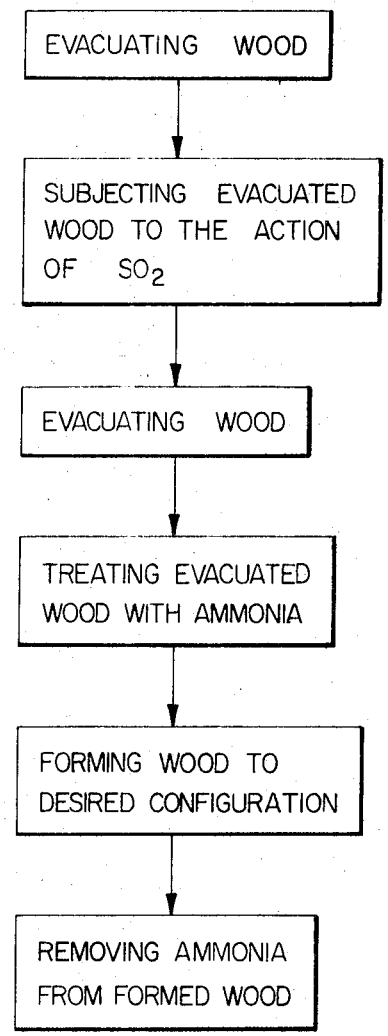
FIG. 1 is a flowsheet of the method of the invention.
Figure 2:
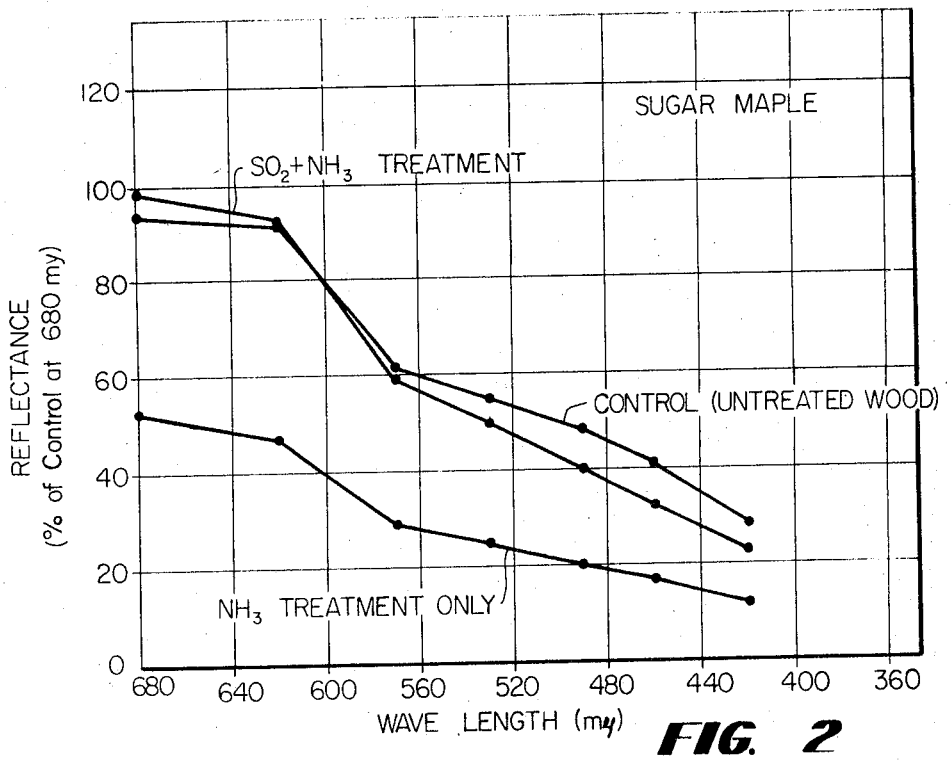
FIGS. 2, 3, 4 and 5 are graphs of comparative reflectance tests on specimens of sugar maple, yellow birch, red oak and Douglas fir, respectively treated by the method of the invention.
Figure 3:
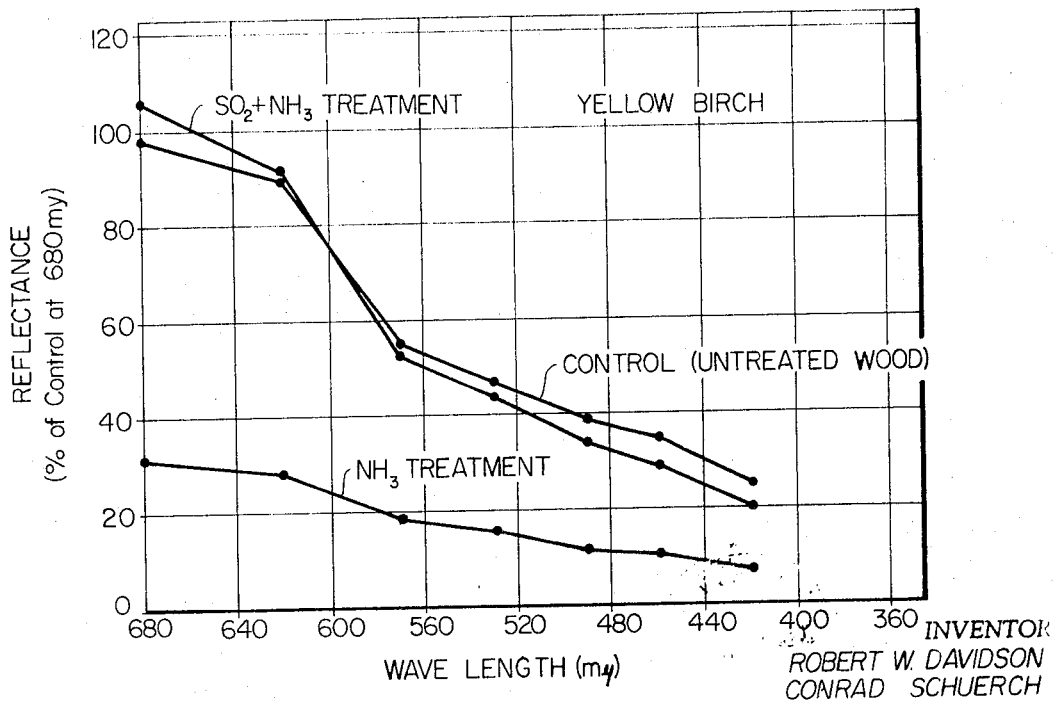
Figure 4:
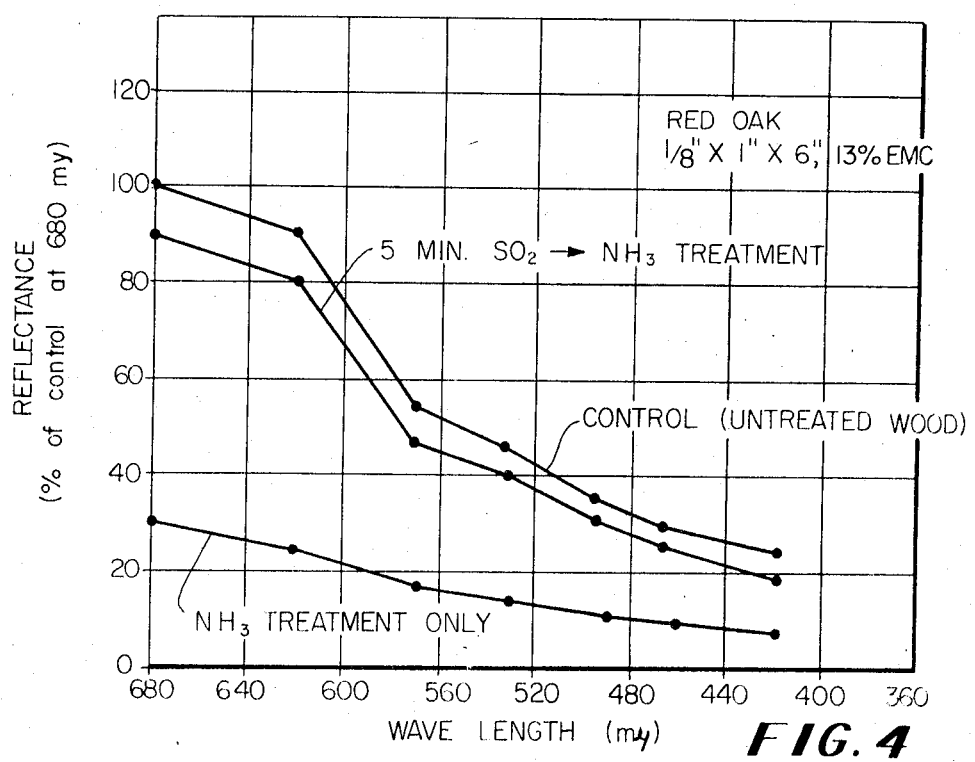
Figure 5:
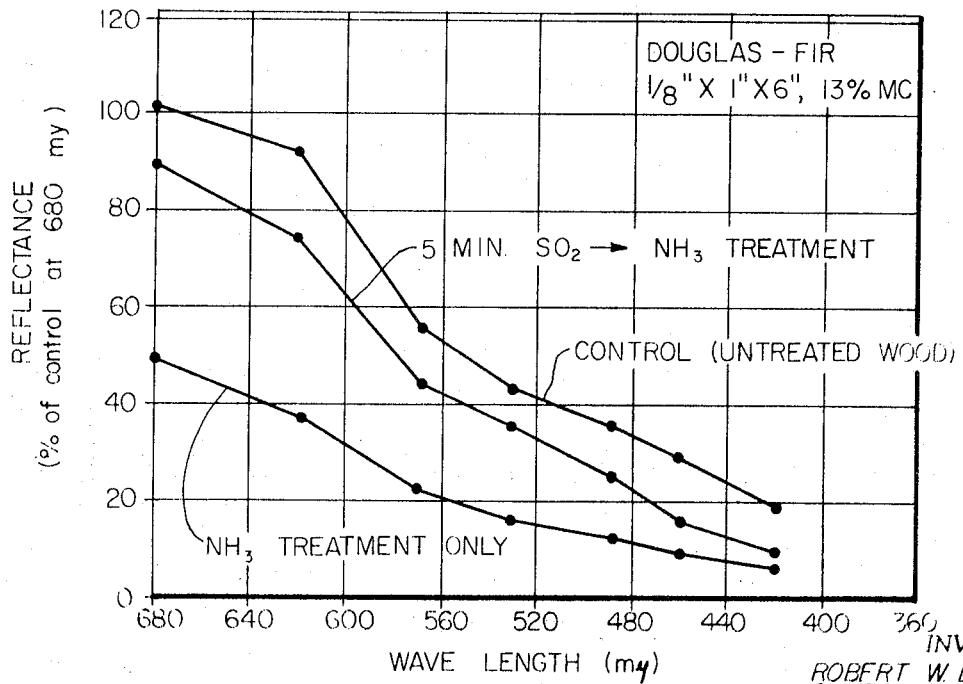

Color reflectance tests on the untreated and the treated specimens were made with a Zeiss "Elrepho" photoelectric reflectance photometer adjusted to read 100 percent reflectance on natural wood at 680 nanometers. Results of the tests are shown in FIGS. 2, 3, 4 and 5.

The method of the invention can be applied to wood or wood substance in various forms, including wood flour and disintegrated wood fibers and to a wide variety of wood species, including but not limited to maple, yellow birch, cottonwood, white ash, loblolly pine, red pine, Douglas fir, eastern white spruce and Englemann spruce.

Optimum conditions for obtaining the desired elimination of coloration with various species and forms of wood at various temperatures of treatment, moisture content of the wood and concentrations of sulfur dioxide can readily be determined by tests similar to those described with reference to FIGS. 2-5.

The term "saturated sulfur dioxide gas" as used herein designates sulfur dioxide gas at its equilibrium pressure with liquid sulfur dioxide under the conditions of operation but the use of sulfur dioxide at less than saturation condition is also possible.

We claim:

1. In the production of wood products by impregnating wood with substantially anhydrous ammonia, forming the impregnated wood to a desired configuration and removing the ammonia from the formed wood, the improvement which comprises subjecting the wood to the action of sulfur dioxide prior to the impregnation of the wood with ammonia.

2. The method defined in claim 1 wherein the wood is evacuated to remove air therefrom, sulfur dioxide gas is admitted to the evacuated wood, and unreacted sulfur dioxide is evacuated from the wood prior to the impregnation of the wood with ammonia.

* * * * *